(12) United States Patent
Wang et al.

(10) Patent No.: US 12,547,851 B2
(45) Date of Patent: Feb. 10, 2026

(54) VR-BASED COMMUNICATION METHOD, INTERACTION METHOD, DEVICE, EQUIPMENT AND MEDIUM

(71) Applicant: COOCAA NETWORK TECHNOLOGY CO., LTD., Guangdong (CN)

(72) Inventors: Zhiguo Wang, Guangdong (CN); Wenliang Tan, Guangdong (CN)

(73) Assignee: COOCAA NETWORK TECHNOLOGY CO., LTD., Shenzhen (CN)

(*) Notice: Subject to any disclaimer, the term of this patent is extended or adjusted under 35 U.S.C. 154(b) by 271 days.

(21) Appl. No.: 18/224,089

(22) Filed: Jul. 20, 2023

(65) Prior Publication Data

US 2024/0330606 A1 Oct. 3, 2024

(30) Foreign Application Priority Data

Mar. 28, 2023 (CN) .......................... 202310355269.0

(51) Int. Cl.
*G10L 15/26* (2006.01)
*G06F 40/58* (2020.01)
(Continued)

(52) U.S. Cl.
CPC ............ *G06F 40/58* (2020.01); *G06T 13/205* (2013.01); *G06T 13/40* (2013.01); *G06T 13/80* (2013.01);
(Continued)

(58) Field of Classification Search
CPC ................................ G10L 15/26; G06F 40/58
See application file for complete search history.

(56) References Cited

U.S. PATENT DOCUMENTS

| 2015/0042662 A1* | 2/2015 | Latorre-Martinez ... G10L 21/10 345/473 |
| 2020/0293622 A1* | 9/2020 | Orlick .................... G10L 15/26 |

(Continued)

FOREIGN PATENT DOCUMENTS

| WO | WO 2023239804 | * 12/2023 | ............. G06F 40/40 |

OTHER PUBLICATIONS

Xie, Lei, Lijuan Wang, and Shan Yang. "Visual Speech Animation." Handbook of Human Motion, Springer (Ed.). Springer (2016): 1-30. (Year: 2016).*

*Primary Examiner* — Jialong He

(57) ABSTRACT

The invention relates to the technical field of communication, in particular to a VR-based communication method, interaction method, device, equipment and medium. The communication method comprises the following steps: acquiring text information sent by any virtual reality device and target language information sent by another virtual reality device; generating interactive template information according to the text information and the target language information; sending the interactive template information to an interactive equipment, wherein the interactive equipment is used for generating a feedback result according to the interactive template information after receiving the interactive template information, and sending the feedback result to the server; and receiving the feedback result sent by the interactive equipment, and sending the feedback result to another virtual reality device, wherein the another virtual reality device is used for constructing a virtual audio and video according to the feedback result.

9 Claims, 4 Drawing Sheets

(51) Int. Cl.
    *G06T 13/20*     (2011.01)
    *G06T 13/40*     (2011.01)
    *G06T 13/80*     (2011.01)
    *G10L 13/02*     (2013.01)
    *G10L 15/04*     (2013.01)
    *G10L 15/22*     (2006.01)
    *G10L 15/30*     (2013.01)

(52) U.S. Cl.
    CPC .............. *G10L 13/02* (2013.01); *G10L 15/04* (2013.01); *G10L 15/26* (2013.01); *G10L 15/30* (2013.01)

(56) References Cited

U.S. PATENT DOCUMENTS

2021/0407506 A1\*   12/2021   Drummond ............. G10L 15/26
2022/0199087 A1\*    6/2022   Liu ......................... A63F 13/92

\* cited by examiner

VR-BASED COMMUNICATION METHOD, INTERACTION METHOD, DEVICE, EQUIPMENT AND MEDIUM

CROSS REFERENCE TO RELATED APPLICATIONS

The present application claims the benefit of Chinese Patent Application No. 202310355269.0 filed on Mar. 28, 2023, the contents of which are incorporated herein by reference in their entirety.

TECHNICAL FIELD

The invention relates to the technical field of communication, in particular to a VR-based communication method, interaction method, device, equipment and medium.

BACKGROUND

With the development of artificial intelligence, natural language processing and other technologies, language translation technology has been widely used in multinational language communication. The purpose of language translation is to translate the content of one language into another language, so as to realize barrier-free communication between different languages.

ChatGPT (Chat Generative Pre-trained Transformer) is a natural language processing tool driven by artificial intelligence technology. It can carry out dialogue by understanding and learning human language, interact according to the conversation context, and even complete tasks such as email writing, video scripts, copywriting, translation, code, paper drafting, etc. It is the most commonly used translation method at present.

However, in the process of speech translation using ChatGPT, the result of speech translation is not accurate because the orientation sent by the server to ChatGPT is not clear. Therefore, how to improve the accuracy of speech translation has become an urgent problem.

SUMMARY

In view of this, the embodiments of the present application provide a VR-based communication method, interaction method, device, equipment and medium, for the purpose to solve the problem of inaccurate speech translation in the prior art.

In a first aspect, an embodiment of the present application provides a VR-based communication method, which includes:
  acquiring text information sent by any virtual reality device and target language information sent by another virtual reality device;
  generating interactive template information according to the text information and the target language information;
  sending the interactive template information to an interactive equipment, wherein the interactive equipment is used for generating a feedback result according to the interactive template information after receiving the interactive template information, and sending the feedback result to the server; and
  receiving the feedback result sent by the interactive equipment, and sending the feedback result to another virtual reality device, wherein the another virtual reality device is used for constructing a virtual audio and video according to the feedback result.

In a second aspect, an embodiment of the present application provides a VR-based communication method, which includes:
  acquiring a user's speech, converting the speech into text information, and sending the text information to the server;
  acquiring translation settings of the user, generating target language information according to the translation settings, and sending the target language information to the server;
  receiving a feedback result sent by the server, and constructing a virtual image according to the feedback result; and
  converting the feedback result into a target speech, and generating a virtual audio and video according to the target speech and the virtual image.

In a third aspect, an embodiment of the present application provides an interactive method, which includes:
  acquiring interactive template information sent by the server, extracting text information and target language information from the interactive template information, and converting the text information into target text corresponding to the target language information; and
  generating a feedback result based on the target text, and sending the feedback result to the server.

In a fourth aspect, an embodiment of the present application provides a VR-based communication device, which includes:
  an information acquisition module, configured to acquire text information sent by any virtual reality device and target language information sent by another virtual reality device;
  a template generation module, configured to generate interactive template information according to the text information and the target language information;
  a result generation module, configured to send the interactive template information to an interactive equipment, wherein the interactive equipment is used for generating a feedback result according to the interactive template information after receiving the interactive template information, and sending the feedback result to the server; and
  a result sending module, configured to receive the feedback result sent by the interactive equipment, and send the feedback result to another virtual reality device, wherein the another virtual reality device is used for constructing a virtual audio and video according to the feedback result.

In a fifth aspect, an embodiment of the present application provides a VR-based communication device, including:
  a first sending module, configured to acquire a user's speech, convert the speech into text information, and send the text information to the server;
  a second sending module, configured to acquire translation settings of the user, generate target language information according to the translation settings, and send the target language information to the server;
  a first processing module, configured to receive a feedback result sent by the server, and construct a virtual image according to the feedback result; and
  a second processing module, configured to convert the feedback result into a target speech, and generate a virtual audio and video according to the target speech and the virtual image.

In a sixth aspect, an embodiment of the present application provides an interactive device, including:

a target acquisition module, configured to acquire interactive template information sent by the server, extract text information and target language information from the interactive template information, and convert the text information into target text corresponding to the target language information; and a target sending module, configured to generate a feedback result based on the target text, and send the feedback result to the server.

In a seventh aspect, an embodiment of the present application provides a computer device, which includes a processor, a memory and a computer program stored in the memory and executable on the processor, when the processor executes the computer program, the communication method described in the first aspect, the communication method described in the second aspect, or the interaction method described in the third aspect is realized.

In an eighth aspect, an embodiment of the present application provides computer-readable storage medium, the storage medium stores a computer program, when the computer program is executed by a processor, the communication method described in the first aspect, the communication method described in the second aspect, or the interaction method described in the third aspect is realized.

Compared with the prior art, the embodiments of the present application have the following beneficial effects:

acquiring text information sent by any virtual reality device and target language information sent by another virtual reality device; generating interactive template information according to the text information and the target language information; sending the interactive template information to an interactive equipment, wherein the interactive equipment is used for generating a feedback result according to the interactive template information after receiving the interactive template information, and sending the feedback result to the server; and receiving the feedback result sent by the interactive equipment, and sending the feedback result to another virtual reality device, wherein the another virtual reality device is used for constructing a virtual audio and video according to the feedback result. With the interactive template information generated by text information and target language information, the orientation of server is enhanced, and the accuracy of feedback result of interactive equipment is improved.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

DETAILED DESCRIPTION OF PREFERRED EMBODIMENTS

Figure 1:
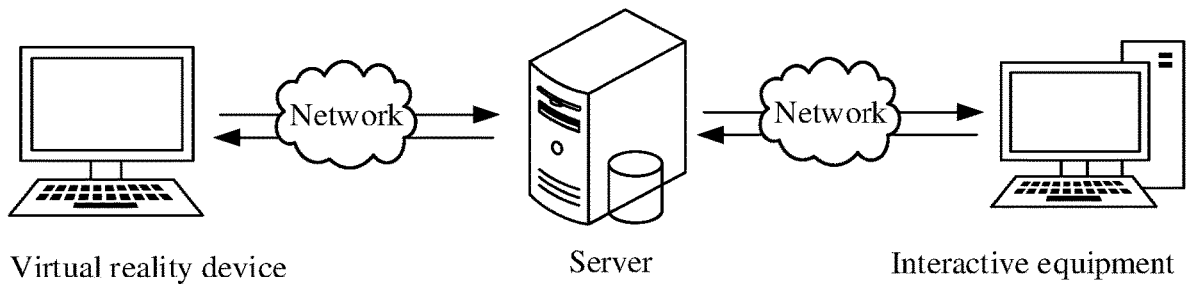
FIG. 1 is a schematic diagram of an application environment of a VR-based communication method provided by Embodiment 1 of the present application.

In the following description, specific details, such as specific system structure and technology, are set forth for the purpose of illustration rather than limitation, so as to provide a thorough understanding of embodiments of the invention. However, it would be apparent to one skilled in the art that embodiments of the invention may be practiced without these specific details. In other instances, detailed descriptions of well-known systems, devices, circuits and methods are omitted so as not to obscure the description of the present invention with unnecessary details.

It should be understood that that term "comprise" when used in the specification and append claims of the present invention indicates the presence of the described features, integers, steps, operations, elements, and/or components, but does not preclude the presence or addition of one or more other features, integers, steps, operations, elements, components, and/or groups thereof.

It should also be understood that the term "and/or" used in the present specification and the appended claims refers to and encompasses any and all possible combinations of one or more of the associated listed items, and includes these combinations.

As used in the specification of the present invention and the appended claims, the term "if" may be interpreted as "when" or "once" or "in response to determination" or "in response to detection" depending on the context. Similarly, the phrases "if determined" or "if [described condition or event] is detected" may be interpreted as "once determined" or "in response to determination" or "once [described condition or event] is detected" or "in response to detecting [described condition or event]" depending on the context.

In addition, in the description of the present invention and the appended claims, the terms "first", "second" and "third" are merely used for distinguishing descriptions, and not intended to indicate or imply relative importance.

Reference to "one embodiment" or "some embodiments" or the like described in the specification of the present invention means that a specific feature, structure or characteristic described in connection with the embodiment is included in one or more embodiments of the present invention. Thus, the phrases "in one embodiment", "in some embodiments", "in other embodiments" and "in some other embodiments" appearing in various places of this specification do not necessarily all refer to the same embodiment, but mean "one or more but not all embodiments" unless otherwise emphasized. The terms "comprising", "including", "having" and their variations all mean "including but not limited to" unless otherwise specifically emphasized.

It should be understood that the sequence number of each step in the following embodiment does not mean the order of execution, and the order of execution of each process should be determined according to the function and internal logic, and shall not constitute any limitation on the implementation process of the embodiment of the present invention.

In order to illustrate the technical solution of the present invention, the following description will be made with specific embodiments.

The VR-communication method provided by Embodiment 1 of the present application may be applied in the application environment as shown in FIG. 1, in which a virtual reality device communicates with a server, and the server communicates with an interactive equipment. The virtual Reality device includes but is not limited to virtual reality (VR) glasses, VR helmets, VR all-in-one machines, etc. The server may be an independent server or a cloud server that provides basic cloud computing services such as cloud service, cloud database, cloud computing, cloud function, cloud storage, network service, cloud communication, middleware server, domain name service, security service, Content Delivery Network (CDN), big data and artificial intelligence platform. The interactive equipment may be natural language processing tools such as Chat GPT and Natural Language Processing (NLP).

Figure 2:
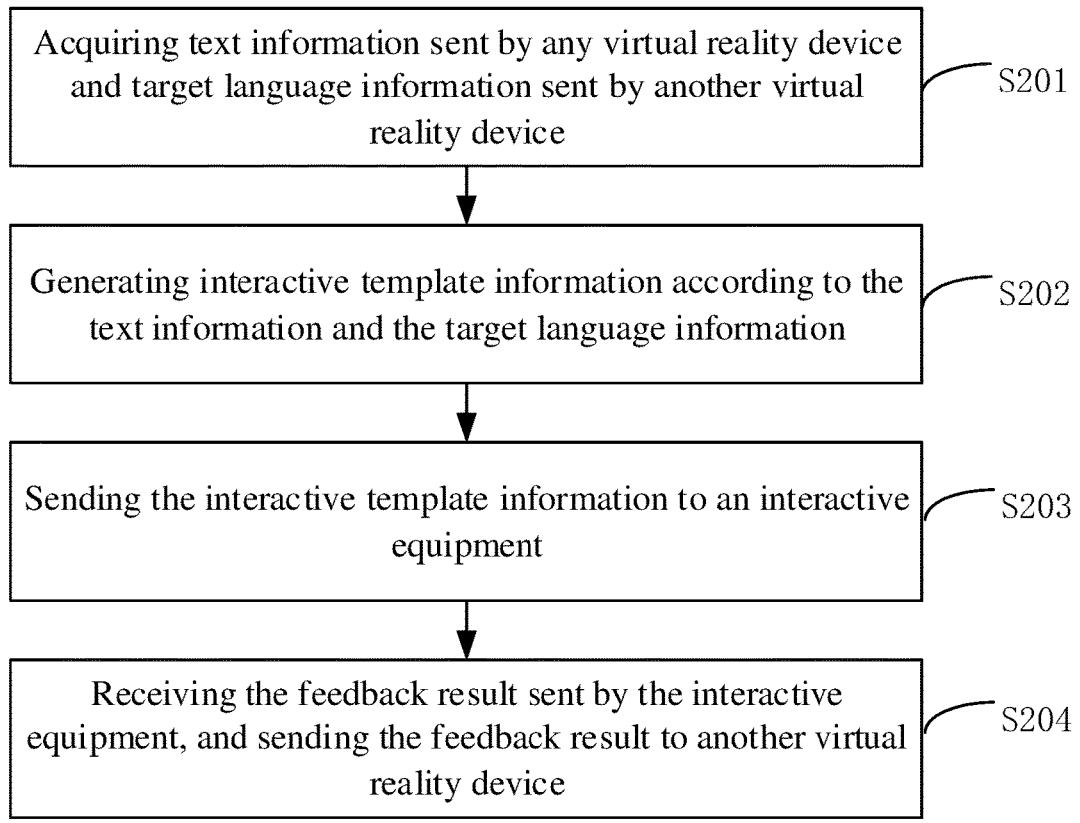
FIG. 2 is a flow diagram of a VR-based communication method provided by Embodiment 1 of the present application.

Referring to FIG. 2, a schematic flow chart of a VR-based communication method provided by Embodiment 1 of the present application. The VR-based communication method described above may be applied to the server in FIG. 1, and the server is used to connect at least two virtual reality devices. As shown in FIG. 2, the communication method may include the following steps:

Step S201: acquiring text information sent by any virtual reality device and target language information sent by another virtual reality device.

In the present application, the text information may refer to the one formed in any language, and the virtual reality device may be provided with an external input device, including but not limited to a keyboard, a handwriting board, a sound collector and other devices capable of acquiring information input by users. For example, when the external input device is a sound collector, the user's speech may be converted into words to form text information.

The target language information may refer to the identification information of any language, i.e., the target language may be uniquely identified according to the identification information, and the target language information may be an editable information stored in the virtual reality device, i.e., users can edit the corresponding target language in the virtual reality device according to their own needs.

For example, in a scenario where virtual reality devices are used to communicate with British people, Chinese users set the target language information in their own virtual reality devices as Chinese, the text information sent by British virtual reality device is acquired, so as to convert what British people say into Chinese, which is convenient for China people to communicate with British people. Therefore, when using virtual reality devices to communicate, it is necessary to obtain the text information sent by any virtual reality device and the target language information sent by other virtual reality devices.

Step S202, generating interactive template information according to the text information and the target language information.

In the application, the interactive template information is information with certain structural characteristics, which is constructed according to the text information, the target voice information and the scenario the invention applied to. After acquiring the text information and the target voice information, the received text information and the target voice information are saved and the interactive template information is generated. For example, if the user has set the conversion to Chinese, the other party's text information will be converted to Chinese, and the corresponding interactive template information is "Convert the received text information to Chinese". The interactive template information enhances the orientation of the server when interacting with interactive equipments.

Step S203: sending the interactive template information to an interactive equipment.

It is, sending the interactive template information to an interactive equipment, the interactive equipment is used for generating a feedback result according to the interactive template information after receiving the interactive template information, and sending the feedback result to the server. The specific process of the interactive equipment may refer to Embodiment 3 below.

In the application, the interactive template information is generated after the server receives the text information and the target language information sent by the virtual reality device, and is used for indicating the operation orientation of the interactive equipment, so that the interactive equipment can generate a corresponding feedback result according to the interactive template information, thus enhancing the operability and functionality of the interactive equipment. Therefore, after the interactive template information is generated, the interactive template information is sent to the interactive equipment, so that the feedback result received by the server is more accurate.

Step S204: receiving the feedback result sent by the interactive equipment, and sending the feedback result to another virtual reality device.

The another virtual reality device is used for constructing a virtual audio and video according to the feedback result, and the specific construction process of the virtual audio and video may refer to Embodiment 2 below.

In the present application, the feedback result sent by the interactive equipment is the feedback result obtained after the interactive equipment performs the conversion step. Specifically, the text information in the interactive template information is converted into the target text corresponding to the target language information, which is used to instruct another virtual reality device to construct a virtual audio and video to realize the communication between different languages. Thus, after receiving the feedback result sent by the interactive equipment, the feedback result is sent to another virtual reality device, so as to display the feedback result by another virtual reality device, thereby realizing barrier-free communication.

According to the embodiment of the present application, acquiring text information sent by any virtual reality device and target language information sent by another virtual reality device; generating interactive template information according to the text information and the target language information; sending the interactive template information to an interactive equipment, wherein the interactive equipment is used for generating a feedback result according to the interactive template information after receiving the interactive template information, and sending the feedback result to the server; and receiving the feedback result sent by the interactive equipment, and sending the feedback result to another virtual reality device, wherein the another virtual reality device is used for constructing a virtual audio and video according to the feedback result. With the interactive template information generated by text information and target language information, the orientation of server is enhanced, and the accuracy of feedback result of interactive equipment is improved.

Figure 3:
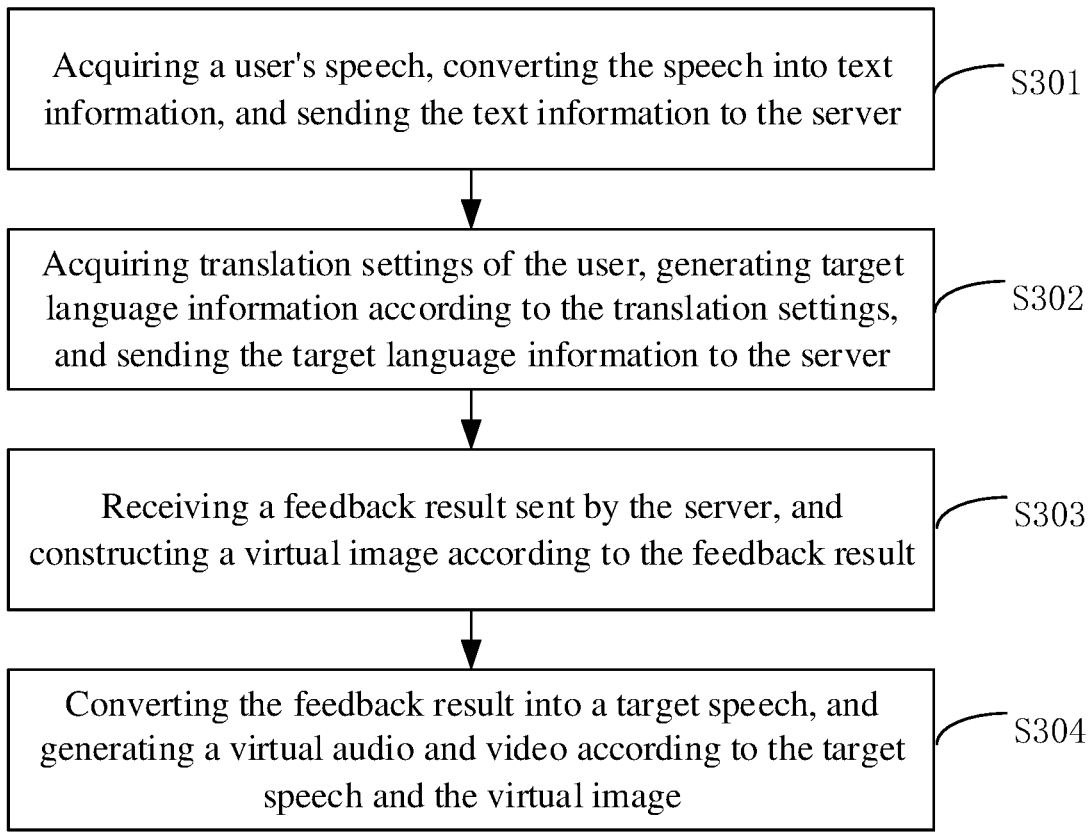
FIG. 3 is a flow diagram of a VR-based communication method provided by Embodiment 2 of the present application.

Referring to FIG. 3, it is a VR-based communication method provided by Embodiment 2 of the present application. The communication method is applied to the virtual reality device in FIG. 1, and the virtual reality device is connected to a server, and the communication method includes:

Step S301: acquiring a user's speech, converting the speech into text information, and sending the text information to the server.

For the virtual reality devices and text information, please refer to the relevant description in Embodiment 1 above, which is not repeated here.

In the application, after the user wears the virtual reality device, the user speaks, and the virtual reality device collects the speech of the user, converts the speech into text information, and then sends the text information to the server.

It should be noted that, in the embodiment of the present application, the method of converting speech into text is the prior art, and the user's speech is converted into text information by using the Text To Speech (TTS) technology.

Step S302: acquiring translation settings of the user, generating target language information according to the translation settings, and sending the target language information to the server.

For the target language information, please refer to the relevant description in Embodiment 1 above, which is not repeated here.

In the communication scenario using virtual reality device, users need to set their own idiomatic language or language they understand, so that the server is clear about the request of the target language that needs to be translated. Therefore, after obtaining the translation settings of user, the target language information is generated according to the translation settings, and the target language is sent to the server.

Step S303: receiving a feedback result sent by the server, and constructing a virtual image according to the feedback result.

In the present application, the feedback result is translated text information generated according to the text information and the target language information. Specifically, it refers to converting the text information into target text corresponding to the target language information. Virtual image is obtained by simulating human body based on human body morphological characteristics. For example, characters are modeled based on 3D technology combined with human body morphological characteristics, and virtual images are obtained through simulation technology. After receiving the feedback result from the server, a virtual image is constructed according to the feedback result.

Optionally, the step of constructing a virtual image according to the feedback result includes:
  performing word segmentation on the feedback result to obtain a word segmentation result sequence, and determining lip animation and facial expression corresponding to each word segmentation according to the word segmentation result sequence; and
  acquiring a virtual character set by the user, and adjusting the virtual character to act by using the lip animation and facial expression corresponding to each word segmentation according to an order of the word segmentation to obtain a virtual image.

It should be noted that in this embodiment, it is necessary to construct a facial animation database of the virtual image in advance, which includes facial movements of the virtual image and corresponding attribute tags. The facial movements include lip animation and facial expressions, and the attribute tags are attribute information of facial movements. By setting the tags of facial movements, actions can be searched based on the tags according to the corresponding word, and rapid matching of actions can be realized. Therefore, in this embodiment, based on the word segmentation result sequence, for each word segmentation, the corresponding lip animation and facial expression are determined in the pre-constructed facial animation database of virtual image by using tags, and then the virtual character is adjusted to act by using the lip animation and facial expression corresponding to each word segmentation to obtain a virtual image, so that the virtual image can show emotional expression and enhance the sense of communication experience and vitality.

In other embodiments, modeling analysis may also be carried out according to the relevant information between lip animation and facial expression corresponding to each word segmentation, and then the virtual character can be adjusted to act according to the order of word segmentation by using the lip animation and facial expression corresponding to each word segmentation obtained by modeling analysis, and a virtual image can be obtained.

Step S304, converting the feedback result into a target speech, and generating a virtual audio and video according to the target speech and the virtual image.

In the present application, the virtual audio and video is obtained by simulating human speech with virtual images. Therefore, after receiving the feedback result, the feedback result is converted into a target speech, and a virtual audio and video is generated according to the target speech and the virtual image.

Optionally, the step of converting the feedback result into a target speech includes:
  generating a target speech according to the word segmentation result sequence;
  the step of generating a virtual audio and video according to the target speech and the virtual image includes: aligning the target speech with the virtual image according to the word segmentation result sequence to obtain a virtual audio and video.

According to the embodiment of the application, acquiring a user's speech, converting the speech into text information, and sending the text information to the server; acquiring translation settings of the user, generating target language information according to the translation settings, and sending the target language information to the server; receiving a feedback result sent by the server, and constructing a virtual image according to the feedback result; converting the feedback result into a target speech, and generating a virtual audio and video according to the target speech and the virtual image. By sending text information and target language information to the server, the orientation of server is enhanced, and the authenticity and accuracy of the virtual audio and video construction are improved, thus achieving barrier-free communication of spoken languages in many countries.

Figure 4:
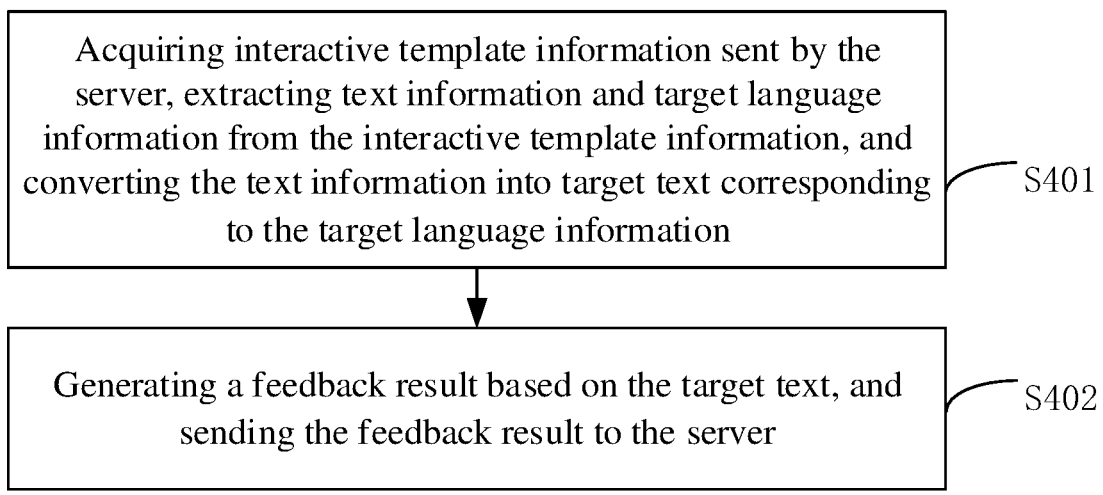
FIG. 4 is a flow diagram of an interaction method provided by Embodiment 3 of the present application.

Referring to FIG. 4, it is an interactive method provided by Embodiment 3 of the present application. The interactive method is applied to the interactive equipment in FIG. 1, and the interactive equipment is connected to a server, and the interactive method includes:

Step S401: acquiring interactive template information sent by the server, extracting text information and target language information from the interactive template information, and converting the text information into target text corresponding to the target language information.

For the interactive template information, text information and target language information, please refer to the relevant description in Embodiment 1 above, which is not repeated here.

Chat GPT shows a high level of human-computer interaction, showing that the large model of natural language already has some characteristics oriented to general artificial intelligence, and can generate corresponding intelligent reply according to the user's text description and historical dialogue. Therefore, in the embodiment of the application, the interactive equipment is Chat GPT. After receiving the interactive template information sent by the server, extracting text information and target language information from the interactive template information, and converting the text information of the interactive template information into target text corresponding to the target language information, thus realizing text translation of the target language.

Step S402: generating a feedback result based on the target text, and sending the feedback result to the server.

According to the embodiment of the application, acquiring interactive template information sent by the server, extracting text information and target language information from the interactive template information, and converting the text information into target text corresponding to the target language information; generating a feedback result based on the target text, and sending the feedback result to the server. With the interactive template information, the orientation of server is enhanced, and the accuracy of the feedback results of the interactive equipment is improved.

Figure 5:
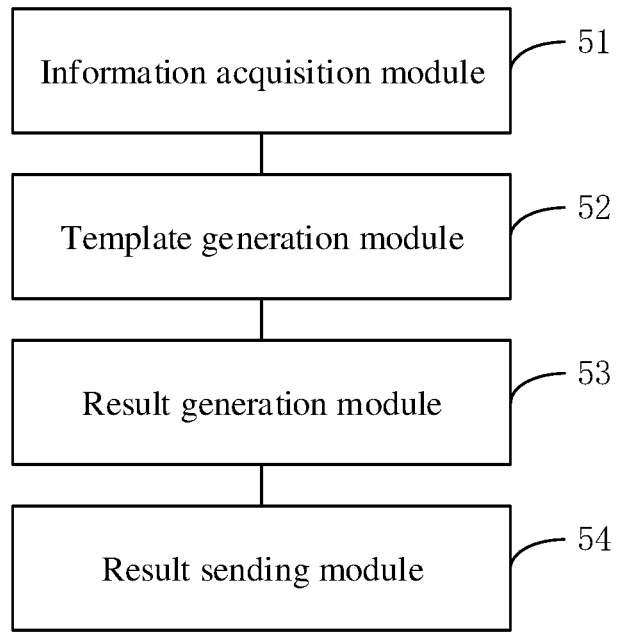
FIG. 5 is a structural schematic diagram of a VR-based communication device provided by Embodiment 4 of the present application.

Corresponding to the VR-based communication method of Embodiment 1 above, FIG. 5 shows the structural block diagram of a VR-based communication device provided by Embodiment 4 of the present application, and only the parts related to the embodiment of the present application are shown for convenience of illustration.

Referring to FIG. 5, the communication device includes:
an information acquisition module 51, configured to acquire text information sent by any virtual reality device and target language information sent by another virtual reality device;
a template generation module 52, configured to generate interactive template information according to the text information and the target language information;
a result generation module 53, configured to send the interactive template information to an interactive equipment, wherein the interactive equipment is used for generating a feedback result according to the interactive template information after receiving the interactive template information, and sending the feedback result to the server; and
a result sending module 54, configured to receive the feedback result sent by the interactive equipment, and send the feedback result to another virtual reality device, wherein the another virtual reality device is used for constructing a virtual audio and video according to the feedback result.

Figure 6:
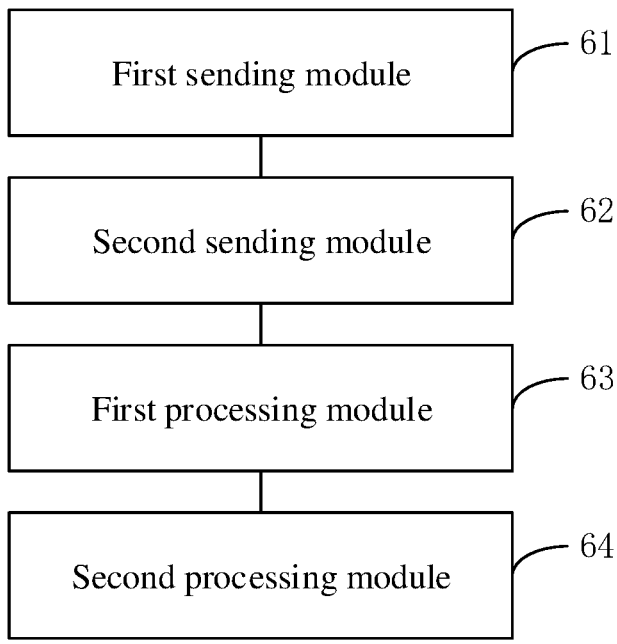
FIG. 6 is a structural schematic diagram of a VR-based communication device provided by Embodiment 5 of the present application.

Corresponding to the VR-based communication method of Embodiment 2 above, FIG. 6 shows the structural block diagram of a VR-based communication device provided by Embodiment 5 of the present application, and only the parts related to the embodiment of the present application are shown for convenience of illustration.

Referring to FIG. 6, the communication device includes:
a first sending module 61, configured to acquire a user's speech, convert the speech into text information, and send the text information to the server;
a second sending module 62, configured to acquire translation settings of the user, generate target language information according to the translation settings, and send the target language information to the server;
a first processing module 63, configured to receive a feedback result sent by the server, and construct a virtual image according to the feedback result; and
a second processing module 64, configured to convert the feedback result into a target speech, and generate a virtual audio and video according to the target speech and the virtual image.

Optionally, the first processing module 63 includes:
a word segmentation processing unit, configured to perform word segmentation on the feedback result to obtain a word segmentation result sequence, and determine lip animation and facial expression corresponding to each word segmentation according to the word segmentation result sequence; and
an image construction unit, configured to acquire a virtual character set by the user, and adjust the virtual character to act by using the lip animation and facial expression corresponding to each word segmentation according to an order of the word segmentation to obtain a virtual image.

Optionally, the second processing module 64 includes:
a target speech generation unit, configured to generate a target speech according to the word segmentation result sequence;
an audio and video construction unit, configured to align the target speech with the virtual image according to the word segmentation result sequence to obtain a virtual audio and video.

Figure 7:
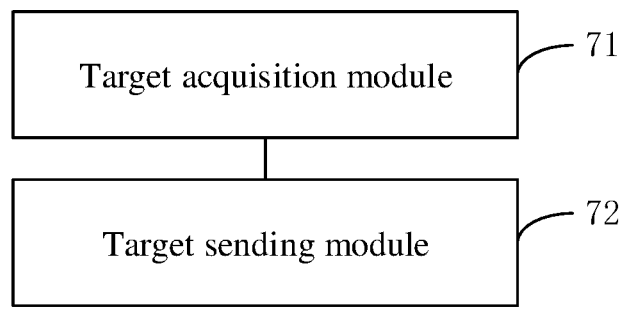
FIG. 7 is a structural schematic diagram of an interactive device provided by Embodiment 6 of the present application.

Corresponding to the VR-based communication method of Embodiment 3 above, FIG. 7 shows the structural block diagram of an interactive device provided by Embodiment 6 of the present application, and only the parts related to the embodiment of the present application are shown for convenience of illustration.

Referring to FIG. 7, the interactive device includes:
a target acquisition module 71, configured to acquire interactive template information sent by the server, extract text information and target voice information from the interactive template information, and convert the text information into target text corresponding to the target voice information; and
a target sending module 72, configured to generate a feedback result based on the target text, and send the feedback result to the server.

It should be noted that the information interaction, execution process and other contents among the above modules are based on the same concept as the method embodiments of the present application, and their specific functions and technical effects can be seen in the method embodiment section for details, which will not be repeated here.

Figure 8:
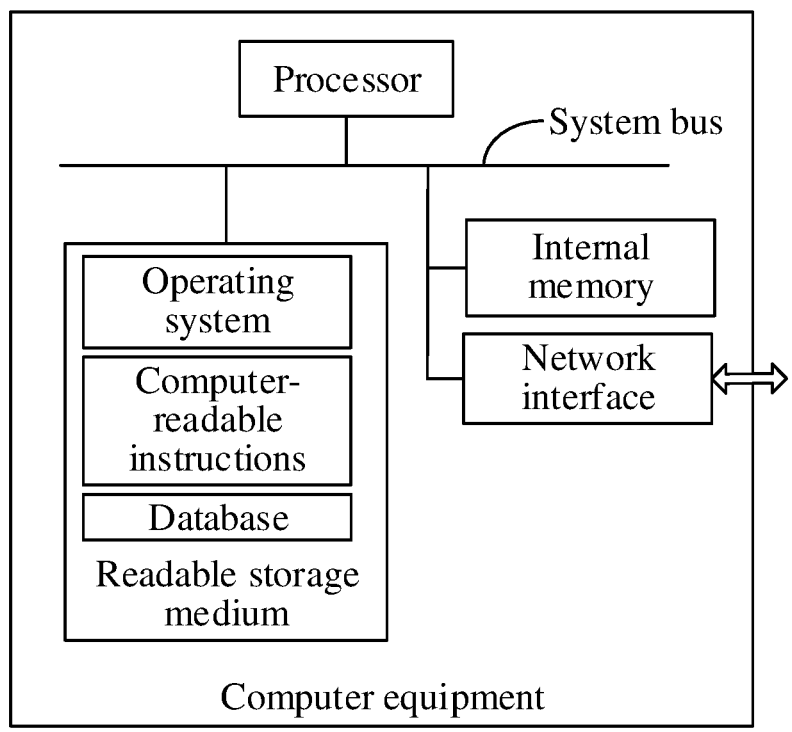
FIG. 8 is a structural schematic diagram of a computer equipment provided by Embodiment 7 of the present application.

FIG. 8 is a structural schematic diagram of a computer equipment provided by Embodiment 7 of the present application. As shown in FIG. 8, the computer equipment of this embodiment includes at least one processor (only one is shown in FIG. 8), a memory, and a computer program stored in the memory and executable on the at least one processor, and when the processor executes the computer program, it realizes the steps of any of the above-mentioned communication methods or interactive methods.

The computer equipment may include, but is not limited to, a processor and a memory. It can be understood by those skilled in the art that FIG. 8 is only an example of a computer equipment, and does not constitute a limitation on the computer equipment. The computer equipment may include more or less components than the illustration, or some components may be combined, or different components may be included, for example, a network interface, a display screen, an input device and the like.

The processor may be a Central Processing Unit (CPU), other general-purpose processors, Digital Signal Processor (DSP), Application Specific Integrated Circuit (ASIC), Field-Programmable Gate Array (FPGA) or other programmable logic devices, discrete gate or transistor logic devices, discrete hardware components, etc. The general-purpose processor may be a microprocessor, or the processor may be any conventional processor, etc.

The memory includes a readable storage medium, an internal memory, etc., wherein the internal memory may be the memory of a computer equipment, and the internal memory provides an environment for the operation of an operating system and computer-readable instructions in the readable storage medium. The readable storage medium may be the hard disk of the computer equipment, and in other embodiments, it may also be the external storage device of the computer equipment, for example, a plug-in hard disk, a Smart Media Card (SMC), a Secure Digital (SD) card, a Flash Card, etc. provided on the computer equipment. Further, the memory may also include both the internal storage unit and external storage device of the computer equipment. The memory is used to store operating system, application programs, BootLoader, data and other programs, such as program codes of computer programs. The memory may also be used to temporarily store data that has been or will be output.

It can be clearly understood by those skilled in the art that for the convenience and conciseness of description, only the division of the above-mentioned functional units and modules is taken as an example. In practical application, the above-mentioned functional allocation may be completed with different functional units and modules as required, that is, the internal structure of the device is divided into different functional units or modules to complete all or part of the functions described above. Each functional unit and module in the embodiment may be integrated into one processing unit, or each unit may exist physically alone, or two or more units may be integrated into one unit. The integrated units may be realized in the form of hardware or software functional units. In addition, the specific names of each functional unit and module are merely for the convenience of distinguishing each other, and are not used to limit the protection scope of the invention. The specific working processes of the units and modules in the above-mentioned devices can refer to the corresponding processes in the above-mentioned method embodiments, and will not be repeated here. Integrated units may be stored in a computer-readable storage medium if they are implemented in the form of software functional units and sold or used as independent products. Based on this understanding, all or part of the processes in the method of the above embodiments may be completed by instructing related hardware through a computer program, the computer program may be stored in a computer-readable storage medium, and when executed by a processor, can realize the steps of methods described in the above embodiments. The computer program includes computer program code, which may be in the form of source code, object code, executable file, or in some intermediate form. A computer-readable medium may at least include any entity or device capable of carrying computer program codes, recording media, computer memory, Read-Only Memory (ROM), Random Access Memory (RAM), electric carrier signals, telecommunication signals and software distribution media. Such as a USB flash disk, a removable hard disk, a magnetic disk or an optical disk. In some jurisdictions, according to legislation and patent practice, computer-readable medium cannot be electric carrier signals and telecommunication signals.

All or part of the flow of the method in the above embodiments may also be realized by a computer program product. When the computer program product runs on a computer equipment, the computer equipment executes it, the steps of methods described in the above embodiments may be realized.

In the above-mentioned embodiments, the description of each embodiment has its own emphasis. For the parts that are not detailed or recorded in one embodiment, please refer to the relevant descriptions of other embodiments.

Those of ordinary skill in the art may realize that the units and algorithm steps of various examples described in connection with the embodiments disclosed herein may be implemented in electronic hardware, or a combination of computer software and electronic hardware. Whether these functions are implemented in hardware or software depends on the specific application and design constraints of the technical solution. Skilled people may use different methods to realize the described functions for each specific application, but this implementation shall not be considered beyond the scope of the present invention.

For the embodiments provided by the present invention, it should be understood that the disclosed device/computer equipment and method may also be realized in other ways. For example, the device/computer equipment embodiment described above is only schematic. For example, the division of modules or units is only a logical function division. In actual implementation, there may be other division modes, such as multiple units or components may be combined or integrated into another system, or some features may be omitted or not implemented. On the other hand, the mutual coupling or direct coupling or communication connection shown or discussed may be indirect coupling or communication connection through some interfaces, devices or units, which may be electrical, mechanical or other forms.

The units described as separate components may or may not be physically separated, and the components displayed as units may or may not be physical units, that is, they may be located in one place or distributed to multiple network units. Some or all of the units may be selected according to actual needs to achieve the purpose of the embodiment.

The above embodiments are only used to illustrate the technical solutions of this application, but not to limit it. Although the application has been described in detail with reference to the aforementioned embodiments, those of ordinary skill in the art should understand that the technical solutions described in the aforementioned embodiments may still be modified, or some of the technical features may be equivalently replaced. However, these modifications or substitutions do not make the essence of the technical solutions deviate from the spirit and scope of the technical solutions of each embodiment of this application, and should be included in the protection scope of this application.

What is claimed is:

1. A VR-based communication method, characterized in that the communication method is applied to a server, and the server is used to connect at least two virtual reality devices, comprising:
   acquiring text information sent by any virtual reality device and target language information sent by another virtual reality device;
   generating interactive template information according to the text information and the target language information;
   sending the interactive template information to an interactive equipment, wherein the interactive equipment is configured to generate a feedback result according to the interactive template information after receiving the interactive template information, and send the feedback result to the server; and
   receiving the feedback result sent by the interactive equipment, and sending the feedback result to another virtual reality device, wherein the another virtual reality device is configured to construct a virtual audio and video according to the feedback result.

2. A computer equipment, comprising a processor, a memory and a computer program stored in the memory and executable on the processor, wherein when the processor executes the computer program, the communication method of claim 1 is realized.

3. A non-transitory computer-readable storage medium, wherein the storage medium stores a computer program, when the computer program is executed by a processor, the communication method of claim 1 is realized.

4. A VR-based communication method, characterized in that the communication method is applied to a virtual reality device, and the virtual reality device is connected with a server, comprising:
   acquiring a user's speech, converting the speech into text information, and sending the text information to the server;
   acquiring translation settings of the user, generating target language information according to the translation settings, and sending the target language information to the server;
   receiving a feedback result sent by the server, and constructing a virtual image according to the feedback result; and
   converting the feedback result into a target speech, and generating a virtual audio and video according to the target speech and the virtual image;
   wherein the step of constructing a virtual image according to the feedback result comprises:
   performing word segmentation on the feedback result to obtain a word segmentation result sequence, and determining lip animation and facial expression corresponding to each word segmentation according to the word segmentation result sequence; and
   acquiring a virtual character set by the user, and adjusting the virtual character to act by using the lip animation and facial expression corresponding to each word segmentation according to an order of the word segmentation to obtain a virtual image.

5. The communication method of claim 4, wherein the step of converting the feedback result into a target speech comprises:
   generating a target speech according to the word segmentation result sequence;
   the step of generating a virtual audio and video according to the target speech and the virtual image comprises:
   aligning the target speech with the virtual image according to the word segmentation result sequence to obtain a virtual audio and video.

6. A computer equipment, comprising a processor, a memory and a computer program stored in the memory and executable on the processor, wherein when the processor executes the computer program, the communication method of claim 5 is realized.

7. A non-transitory computer-readable storage medium, wherein the storage medium stores a computer program, when the computer program is executed by a processor, the communication method of claim 5 is realized.

8. A computer equipment, comprising a processor, a memory and a computer program stored in the memory and executable on the processor, wherein when the processor executes the computer program, the communication method of claim 2 is realized.

9. A non-transitory computer-readable storage medium, wherein the storage medium stores a computer program, when the computer program is executed by a processor, the communication method of claim 2 is realized.

* * * * *